United States Patent [19]
Grosspietsch et al.

[11] Patent Number: 5,779,019
[45] Date of Patent: Jul. 14, 1998

[54] HYDRAULICALLY OPERATED CLUTCH ASSEMBLY FOR A MOTOR VEHICLE HAVING A CYLINDER WITH A PLUG-IN CONNECTION

[75] Inventors: Wolfgang Grosspietsch; Herbert Voit; Manfred Wehner, all of Schweinfurt, Germany

[73] Assignee: Fichtel & Sachs AG, Schweinfurt, Germany

[21] Appl. No.: 821,169

[22] Filed: Mar. 21, 1997

Related U.S. Application Data

[63] Continuation of Ser. No. 389,012, Feb. 15, 1995.

[30] Foreign Application Priority Data

Feb. 16, 1994 [DE] Germany ............... 44 04 731.2

[51] Int. Cl.⁶ ............... F16L 37/14; F15B 15/14; F15B 7/08; F15B 9/12
[52] U.S. Cl. ............... 192/85 C; 192/91 R
[58] Field of Search ............... 192/85 C, 91 R; 285/305, 319

[56] References Cited

U.S. PATENT DOCUMENTS

| | | |
|---|---|---|
| 3,333,665 | 8/1967 | Einchcomb et al. ........... 192/91 R X |
| 3,430,744 | 3/1969 | Katsuhiko ................... 192/91 R X |
| 4,526,411 | 7/1985 | Bartholomew . |
| 4,665,802 | 5/1987 | Barker et al. ............... 192/85 C X |
| 4,998,609 | 3/1991 | Nix et al. ................... 192/85 C X |
| 5,273,323 | 12/1993 | Calmettes et al. .............. 285/305 X |
| 5,423,577 | 6/1995 | Ketcham ........................ 285/305 |
| 5,472,242 | 12/1995 | Petersen ..................... 285/305 X |

FOREIGN PATENT DOCUMENTS

| | | |
|---|---|---|
| 0530778 | 3/1993 | European Pat. Off. . |
| 1289274 | 9/1962 | France . |
| 3730727 | 3/1989 | Germany . |
| 4219235 | 9/1993 | Germany . |
| 2087021 | 5/1982 | United Kingdom . |

*Primary Examiner*—Charles A. Marmor
*Assistant Examiner*—Saúl J. Rodríguez
*Attorney, Agent, or Firm*—Nils H. Ljungman and Associates

[57] ABSTRACT

A cylinder for hydraulic systems, in particular for motor vehicles, generally includes a housing having an axial hole in which a piston is guided so that the piston can be displaced axially. One end surface of the piston can be pressurized by means of hydraulic fluid. The cylinder is provided with at least one connection designed as a plug-in connection, for the insertion of at least one pressure medium line having a radially expanded portion on its outside diameter. The plug-in connection of the cylinder is designed so that both the expense for components and for labor required to fasten the pressure medium line to the connection of the cylinder can be minimized.

13 Claims, 6 Drawing Sheets

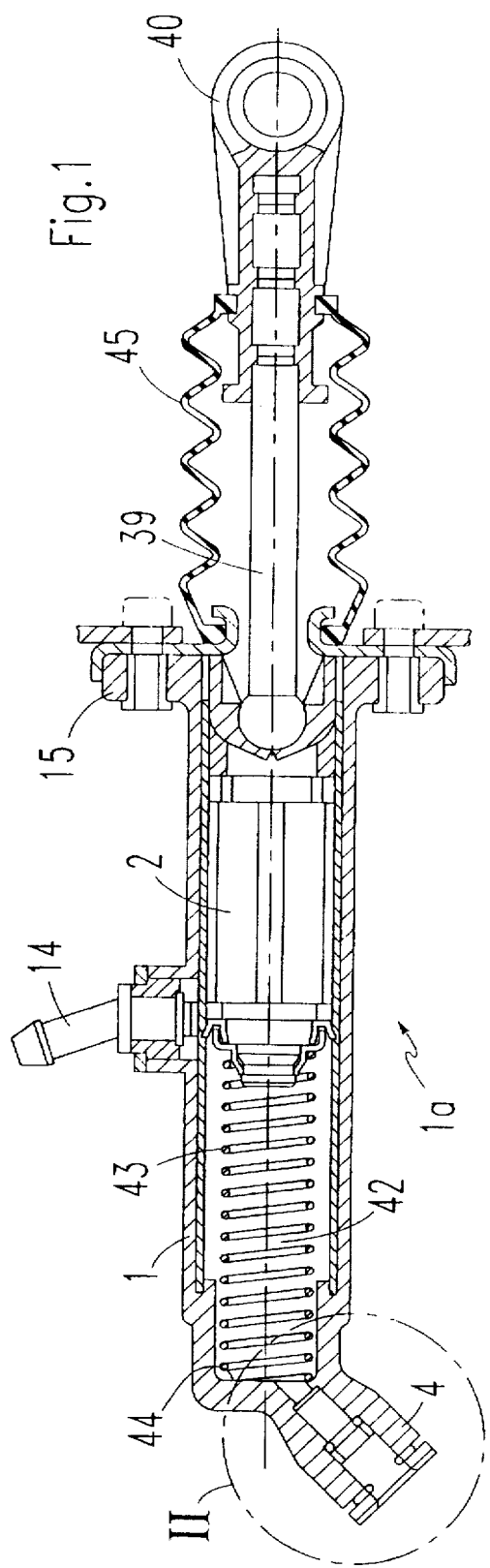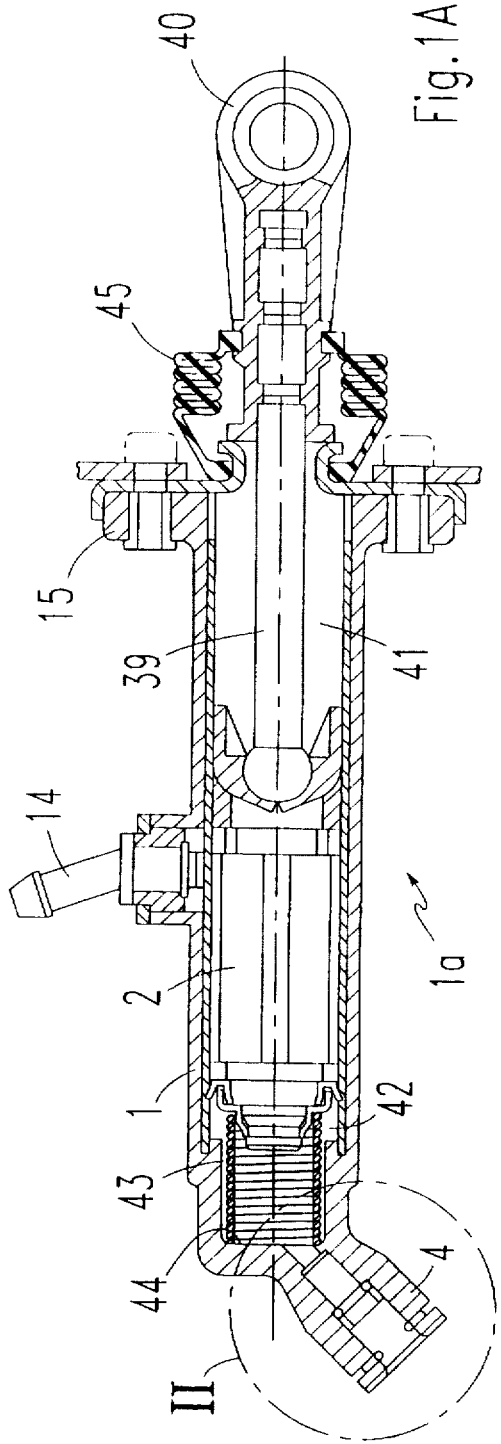

HYDRAULICALLY OPERATED CLUTCH ASSEMBLY FOR A MOTOR VEHICLE HAVING A CYLINDER WITH A PLUG-IN CONNECTION

This application is a continuation of U.S. patent application Ser. No. 08/389,012, filed on Feb. 15, 1995, which claims priority from Fed. Rep. of Germany Patent Application No. P 44 04 731.2, filed on Feb. 16, 1994.

BACKGROUND OF THE INVENTION

1. Field of the Invention

The present invention generally relates to a cylinder for hydraulic systems, in particular for motor vehicles. More particularly, such a cylinder could be a slave cylinder or a master cylinder of a hydraulic clutch system, or a master cylinder in a braking system. The cylinder can include a housing with an axial hole, in which hole a piston can be guided axially. The piston can have an end surface which is pressurized by means of hydraulic fluid. The cylinder can also be provided with at least one connection, which connection can be designed as a plug-in connection for connecting at least one pressure medium line to the cylinder. Further, the pressure medium line can have at least one radially expanded portion on an outside diameter thereof.

2. Background Information

German Patent Application No. 37 30 727 C2 discloses a cylinder with a connection for a pressure medium line, which connection is designed as a plug-in connection. The pressure medium line is securely held in the axial direction in a plug element, and is fastened in the cylinder connection by means of this plug element.

One disadvantage of such a plug-in connection is that in a first step, the pressure medium line must be fastened in the plug-in element, and in a second step, the plug-in element must be fastened in the connection with the cylinder. Accordingly, the manufacture of the plug-in connection can be relatively complex, time-consuming and expensive.

OBJECT OF THE INVENTION

The object of the present invention is to design a plug-in connection for a cylinder so that both the expense for components and for labor required to fasten a pressure medium line to the connection on the cylinder is minimal.

SUMMARY OF THE INVENTION

The present invention teaches that this object can be accomplished if the pressure medium line is preferably located in a hole of the connection of the cylinder, which connection can preferably have a recess over at least a portion of its circumference. The pressure medium line can preferably be axially fixed on one end by means of its radially expanded portion and a spring element located in the recess of the cylinder connection, and, on the other end by means of a support element of the connection. As a result of the configuration of the pressure medium line with the radially expanded portion, and as a result of the engagement of the spring on one side of the radially expanded portion, and the location of the support element on the other side of the radially expanded portion, the pressure medium line can be fastened essentially directly in the cylinder connection, so that there is essentially no need for a plug element. The expense relating to the components of the plug-in connection in accordance with the present invention, as well as the labor required to manufacture the plug-in connection, can therefore typically be reduced to a minimum.

In addition to preventing axial movement of the pressure medium line, the pressure medium line can also be fixed radially within the hole of the connection. The configuration of the external surface of the radially expanded portion, on a side facing the support element, can preferably serve to fix the pressure medium line radially within the hole of the connection, in particular it the support element, which support element interacts with at least a portion of this external surface, is also guided radially in the cylinder connection. An additional advantageous embodiment of present invention provides that the support element can preferably be in the form of an elastic ring, in order to make the plug-in connection elastic.

Additional advantageous embodiments of the present invention include configuring the spring element to preferably have the form of a U-shaped clip with two legs, and configuring the two legs of the spring such that the legs extend at approximate right angles with respect to the longitudinal direction of the pressure medium line. These features can provide optimal protection for the pressure medium line against unintentional release from the connection with the cylinder, in addition to the easier manufacture of the plug-in connection in accordance with the present invention.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct inventions The Applicants hereby assert that the disclosure of this application may include more than one invention, and, in the event that there is more than one invention, that these inventions may be patentable and non-obvious one with respect to the other.

One aspect of the invention resides broadly in a hydraulically operated clutch assembly for a motor vehicles the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically actuating the clutch disc; the hydraulic actuating means comprising: a cylinder, the cylinder having a first end and a second end and defining a chamber therein, at least a portion of the chamber comprising hydraulic fluid therein; piston rod means extending through the first end of the cylinder and into the chamber; first means for operatively connecting the pressure plate to one of: the cylinder and the piston rod means; means for providing hydraulic fluid into and out of the chamber, the means for providing hydraulic fluid comprising male fastening means, the male fastening means having a longitudinal axis; pedal means for applying pressure to the hydraulic fluid within the chamber to operate the pressure plate to apply the axially directed force, at least a portion of the pedal means being disposed in a passenger compartment of a motor vehicle; second means for operatively connecting the pedal means to the other one of: the cylinder and the piston rod means; the cylinder comprising: a piston disposed on the piston rod means within the chamber, the piston dividing the chamber into at least two chamber portions, the piston being movable within the chamber; at least one of the at least two chamber portions being configured to contain the hydraulic fluid therein; means for connecting the means for providing hydraulic fluid to the at least one of the at least two chamber portions containing hydraulic fluid therein; the connecting means comprising female fastening means configured for receiving the male fastening means; the male fastening means comprising a tubular portion having first and second parts, the first part for being inserted into the female fastening means, the second part being disposed immediately adjacent the first part; the first part of the tubular portion comprising an outward, radial deformation of the tubular portion, the outward, radial deformation having a diameter greater than a diameter of the second part; and the female fastening means comprising a clip for being disposed about the second part of the tubular portion for axially fixing, with respect to the longitudinal axis of the male fastening means, the first part of the tubular portion within the female fastening means, the clip for being disposed adjacent the outward, radial deformation of the first part of the tubular portion.

Another aspect of the invention resides broadly in a piston-cylinder arrangement for a hydraulic system in a motor vehicle, the piston-cylinder arrangement comprising: hydraulic actuating means; the hydraulic actuating means comprising: a cylinder, the cylinder having a first end and a second end and defining a chamber therein, at least a portion of the chamber comprising hydraulic fluid therein; piston rod means extending through the first end of the cylinder and into the chamber; means for providing hydraulic fluid into and out of the chamber, the means for providing hydraulic fluid comprising male fastening means, the male fastening means having a longitudinal axis; the cylinder comprising: a piston disposed on the piston rod means within the chamber, the piston dividing the chamber into at least two chamber portions, the piston being movable within the chamber; at least one of the at least two chamber portions being configured to contain the hydraulic fluid therein; means for connecting the means for providing hydraulic fluid to the at least one of the at least two chamber portions containing hydraulic fluid therein; the connecting means comprising female fastening means configured for receiving the male fastening means; the male fastening means comprising a tubular portion having first and second parts, the first part for being inserted into the female fastening means, the second part being disposed immediately adjacent the first part; the first part of the tubular portion comprising an outward, radial deformation of the tubular portion, the outward, radial deformation having a diameter greater than a diameter of the second part; and the female fastening means comprising a clip for being disposed about the second part of the tubular portion for axially fixing, with respect to the longitudinal axis of the male fastening means, the first part of the tubular portion within the female fastening means, the clip for being disposed adjacent the outward, radial deformation of the first part of the tubular portion.

Yet another aspect of the invention resides broadly in a method of assembling a hydraulically operated clutch for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for hydraulically actuating the clutch disc; the hydraulic actuating means comprising: a cylinder, the cylinder having a first end and a second end and defining a chamber therein, at least a portion of the chamber comprising hydraulic fluid therein; piston rod means extending through the first end of the cylinder and into the chamber; first means for operatively connecting the pressure plate to one of: the cylinder and the piston rod means; means for providing hydraulic fluid into and out of the chamber, the means for providing hydraulic fluid comprising male fastening means, the male fastening means having a longitudinal axis; pedal means for applying pressure to the hydraulic fluid within the chamber to operate the pressure plate to apply the axially directed force, at least a portion of the pedal means being disposed in a passenger compartment of a motor vehicle; second means for operatively connecting the pedal means to the other one of: the cylinder and the piston rod means; the cylinder comprising: a piston disposed on the piston rod means within the chamber, the piston dividing the chamber into at least two chamber portions, the piston being movable within the chamber; at least one of the at least two chamber portions being configured to contain the hydraulic fluid therein; means for connecting the means for providing hydraulic fluid to the at least one of the at least two chamber portions containing hydraulic fluid therein; the connecting means comprising female fastening means configured for receiving the male fastening means; the male fastening means comprising a tubular portion having first and second parts, the first part for being inserted into the female fastening means, the second part being disposed immediately adjacent the first part; the first part of the tubular portion comprising an outward, radial deformation of the tubular portion, the outward, radial deformation having a diameter greater than a diameter of the second part; and the female fastening means comprising a clip for being disposed about the second part of the tubular portion for axially fixing, with respect to the longitudinal axis of the male fastening means, the first part of the tubular portion within the female fastening means, the clip for being disposed adjacent the outward, radial deformation of the first part of the tubular portion, the method comprising the steps of: providing a flywheel defining an axis of rotation and an axial direction parallel to the axis of rotation; providing a clutch disc; providing a pressure plate for applying an axially directed force to the clutch disc, with respect to the axis of rotation of the flywheel, to engage the clutch disc with the flywheel; the step of providing the clutch disc further comprising providing friction lining means for contacting the pressure plate and the flywheel during engagement of the clutch disc with the flywheel; providing means for hydraulically actuating the clutch disc; the step of providing hydraulic actuating-means further comprising: providing a cylinder, the cylinder having a first end and a second end and defining a chamber therein, at least a portion of the chamber comprising hydraulic fluid therein; providing piston rod means; providing first means for operatively connecting the pressure plate to one of: the cylinder and the piston rod means; providing means for providing hydraulic fluid into and out of the chamber; the step of providing the means for providing hydraulic fluid further comprising providing male fastening means, the male fastening means having a longitudinal axis; providing pedal means for applying pressure to the hydraulic fluid within the chamber to operate the pressure plate to apply the axially directed force; providing second means for operatively connecting the pedal means to the other one of: the cylinder and the piston rod means; the step of providing the cylinder further comprising: providing a piston; providing means for connecting the means for providing hydraulic fluid to the at least one of the at least two chamber portions containing hydraulic fluid therein; the step of providing the connecting means further comprising providing female fastening means; the step of providing the male fastening means further comprising providing a tubular portion having first and second parts; the step of providing the female fastening means further comprising providing a clip; the method further comprising the steps of: disposing the clutch disc between the flywheel and the pressure plate; inserting the piston rod means through the first end of the cylinder and into the chamber; operatively connecting, with the first means for operatively connecting, the pressure plate to one of: the cylinder and the piston rod means; disposing at least a portion of the pedal means in the passenger compartment of a motor vehicle; operatively connecting, with the second means for operatively connecting, the pedal means to the other one of: the cylinder and the piston rod means; disposing the piston on the piston rod means within the chamber, the piston dividing the chamber into at least two chamber portions, the piston being movable within the chamber; configuring at least one of the at least two chamber portions to contain the hydraulic fluid therein; configuring the female fastening means for receiving the male fastening means; disposing the second part of the tubular portion immediately adjacent the first part of the tubular portion; configuring the first part of the tubular portion to comprise an outward, radial deformation, the outward, radial deformation having a diameter greater than a diameter of the second part; connecting, with the connecting means, the means for providing hydraulic fluid to the at least one of the at least two chamber portions containing hydraulic fluid therein; the step of connecting with the connecting means further comprising: inserting the first part with the outward, radial deformation, into the female fastening means; and disposing the clip about the second part of the tubular portion and adjacent the outward, radial deformation of the first part, and axially fixing, with respect to the longitudinal axis of the male fastening means, the first part of the tubular portion within the female fastening means.

BRIEF DESCRIPTION OF THE DRAWINGS

Preferred embodiments of the present invention are illustrated in the accompanying drawings, in which;

FIG. 1 shows a cylinder for a hydraulic system in cross section, wherein the piston rod is shown in an extended position;

FIG. 1A shows substantially the same view as FIG. 1, but shows additional details, and also shows the piston rod in a position further inside the cylinder;

DESCRIPTION OF THE PREFERRED EMBODIMENT

Figure 2:
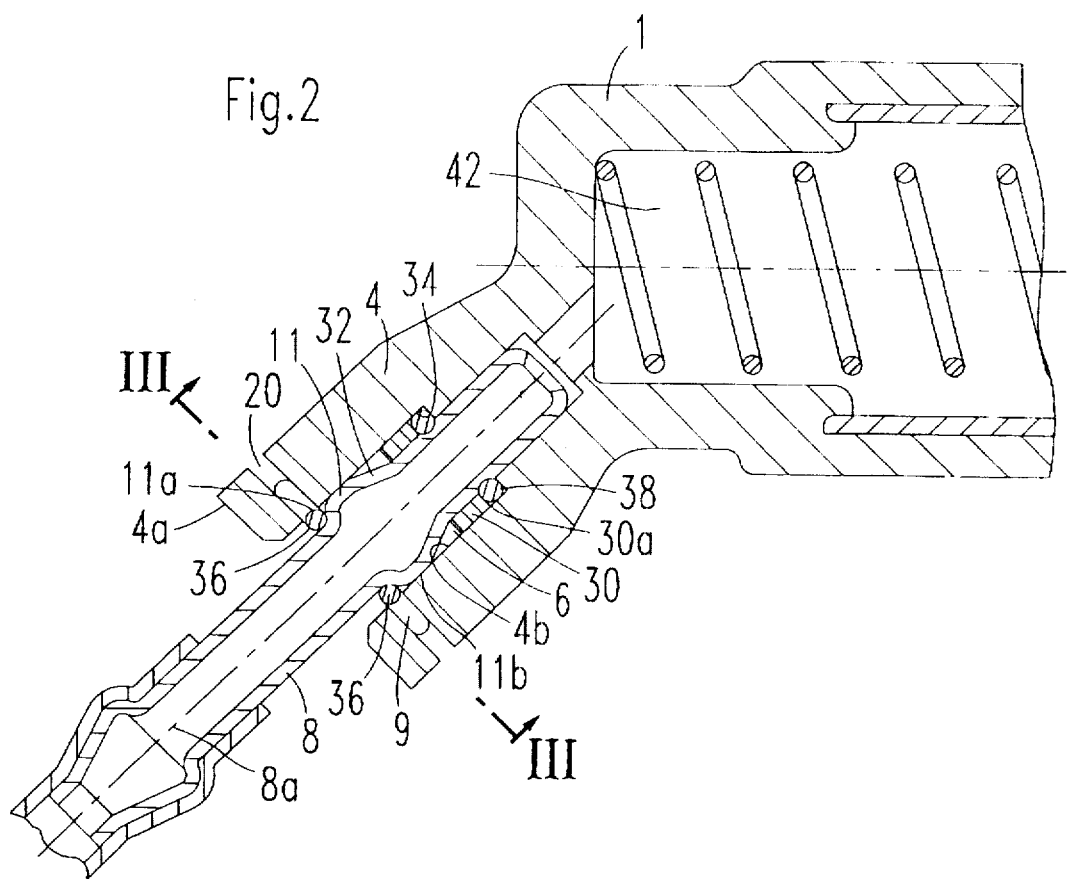
FIG. 2 shows, in cross section, a detail of the housing with the cylinder connection shown in FIGS. 1 and 1A.
Figure 3:
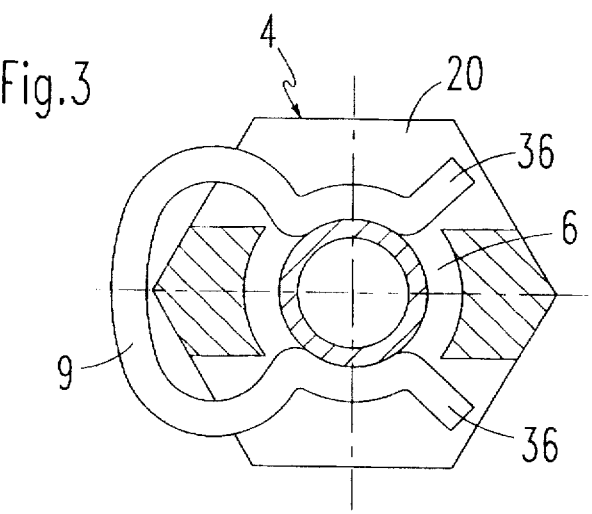
FIG. 3 shows a cross section from FIGS. 2 and 2A.

The cylinder 1A illustrated in FIGS. 1 and 1a generally includes a housing 1 and a piston 2. The housing 1 can preferably be provided with a connection 4 for a pressure medium line 8 (see FIGS. 2 and 2A), a connection 14, and a flange-like fastening connection 15. The piston 2 can preferably be guided within the cylinder 1a so that the piston 2 can move axially, and can be pressurized on its end surface by means of hydraulic fluid.

In accordance with one embodiment of the present invention shown in FIG. 1A, the piston 2 can preferably be attached to a piston rod 39, one end of which piston rod 39 can preferably extend out of cylinder 1a. The end of the piston rod 39 which extends out of the cylinder 1a can preferably be attached to a connecting element 40. The piston 2 can preferably divide the cylinder 1a into an upper working chamber 41 and a lower working chamber 42. The pressure medium line 8 can preferably be used to carry hydraulic medium into the lower working chamber 42, thereby enabling the lower working chamber 42 to be pressurized. In addition, connection 14 can preferably be used as a ventilation line to purge any air in the hydraulic system within the cylinder 1a. In addition to containing the pressure medium, the lower chamber 42 can preferably contain a resilient member 43, such as a spring. The spring 43 can preferably be disposed between the piston 2 and an end wall 44 of the lower chamber 42, and can provide a base pressure for pushing the piston 2 away from the end wall 44.

In accordance with the embodiment shown in FIG. 1A, the upper chamber 41 can preferably be closed off by means of a flexible sleeve or boot 45, which boot 45 can surround the piston rod 39 and is capable of moving with the piston rod 39 due to its accordion-like folds, or bellows. The boot 45 can preferably serve to keep dirt away from the piston rod 39.

It should be noted that FIG. 1 shows the piston rod 39 of the cylinder 1a in an extended position, while FIG. 1A shows the piston rod 39 in a position further inside of the cylinder 1a.

As shown in FIGS. 2, 2A, 3 and 3A, the connection 4 can preferably be provided with a hole 6, in which hole 6 the pressure medium line 8 can be inserted. The hole 6 can preferably have a recess 20 for the insertion of a spring element 9 therein. In accordance with a preferred embodiment of the present invention, the recess 20 can preferably be configured as a radial recess, with respect to a longitudinal axis 8a (see FIG. 2A) of the pressure medium line 8. The spring element 9 can generally be designed as a U-shaped clip with legs 36, as can best be seen in FIGS. 3 and 3A.

Figure 2A:
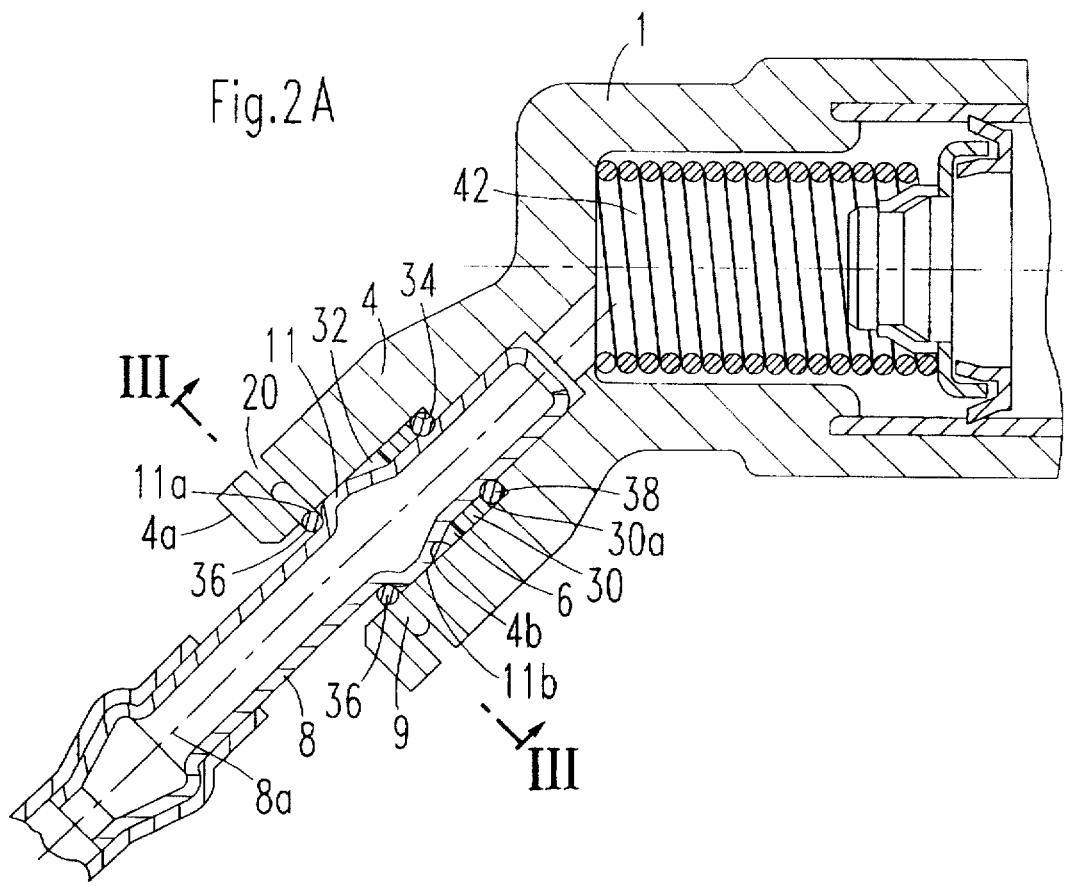
FIG. 2A shows substantially the same view as FIG. 2, but shows additional details.
Figure 3A:
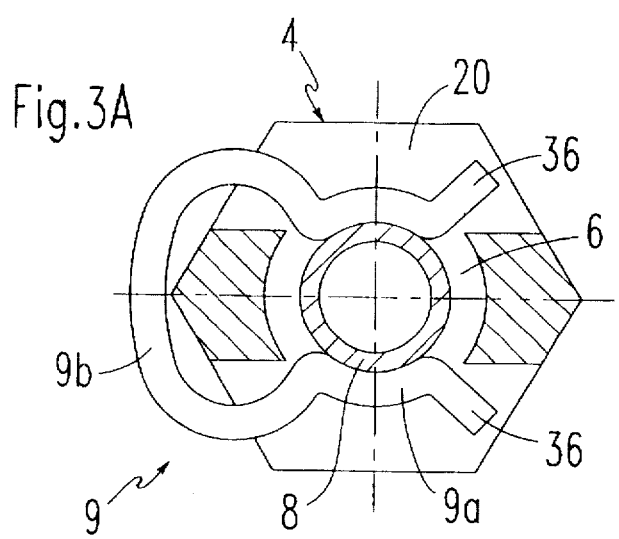
FIG. 3A shows substantially the same view as FIG. 3, but shows additional details.

A support element 30 and a gasket 38 can preferably be located farther down in the axial direction in the hole 6 of the connection 4, i.e. towards lower chamber 42 (see FIG. 2A). In accordance with one embodiment of the present invention, the gasket 38 can preferably provide a sealing function, possibly to prevent leakage of fluid out of the hole 6. The support element 30 can preferably be in the form of an elastomer ring. The support element 30 and the gasket 38 can preferably be located one behind the other, or directly adjacent one another. In addition, the support element 30 can preferably be guided in the hole 6 by means of its radial outside surface 30a (see FIG. 2A) and can be displaced in the axial direction inside the hole 6, preferably until the support element 30 comes into contact, by means of gasket 38, against a stop 34 of the connection 4.

The pressure medium line 8 can preferably have a radial expansion or a radially expanded portion 11, which radially expanded portion 11 can be designed to have an essentially conical, external surface 32. In accordance with at least one embodiment of the present invention, the radially expanded portion 11 can preferably expand conically towards an end surface 4a (see FIG. 2A) of connection 4. In other words, the radially expanded portion 11 can preferably have a cross-section which increases in the direction towards end surface 4a. Further, in accordance with one embodiment, the radially expanded portion 11 can preferably be formed by a deformation process of the pressure medium line 8.

When the pressure medium line 8 is inserted into the hole 6 of the connection 4, the legs 36 of the spring element 9 can preferably be pushed apart by means of the conical outer surface 32, until the legs 36 spring back to their initial position. In accordance with one preferred embodiment of the present invention, when the legs 36 are back in their initial position, or rest position after inserting of the pressure medium line 8 in the hole 6, an intermediate portion 9a (see FIG. 3A) of spring 9 can preferably be in contact with an end surface 11a (see FIG. 2A) of the radially expanded portion 11. When an axial tension is exerted on the pressure medium line 8 in a direction which would tend to pull the line out of the connection 4, i.e. a direction away from end surface 4a, the spring element 9 can preferably prevent movement of the pressure medium line 8 in this direction, preferably by means of the contact between the intermediate portion 9a of the spring 9 and the end surface 11a, as discussed above. Further, and in accordance with at least one additional embodiment, the spring 9 can preferably have an end portion 9b (see FIG. 3A), which end portion 9b can preferably be used to install and remove the spring 9 from the connection 4 when desired. Thus, the pressure medium line 8 can preferably be locked into position in the hole 6 by means of the spring 9 and the radially expanded portion 11. When the pressure medium line 8 is in this locked position, the conical external surface 32 of the radially expanded portion 11 can be pushed in the axial direction, at least some distance, into the inside diameter 30a of the support element 30, and can preferably be fixed in the axial direction against the stop 34. Further, the pressure medium line 8 can preferably be fixed in the radial direction against the inside diameter 4b (see FIG. 2A) of the connection 4 by means of its contact with the gasket 38. In other words, the pressure medium line 8 can preferably be fixed in the radial direction against the inside diameter 4b of connection 4 by means of the interposition of gasket 38 between the pressure medium line 8 and the inside diameter 4b of connection 4. Further, in accordance with one embodiment, the radially expanded portion 11 can also serve to provide at least some radial guidance for the pressure medium line 8 inside the hole 6, in that a surface 11b (see FIG. 2A) of portion 11 can preferably be in essentially direct contact with the inside diameter 4b of the connection 4.

Thus, in accordance with at least one embodiment of the present invention, the pressure medium line 8 can preferably be installed into connection 4 in one step. Essentially, no additional steps are necessary other than to push the pressure medium line 8 with its radially expanded portion 11 into connection 4 past spring element 9, so that the legs 36 of the spring element 9 initially move outward, around portion 11, and then spring back into place at the base of portion 11. Further, as can be seen in FIGS. 1, 1A, 2 and 2A, the connection 4 can preferably be integral with the housing 1.

In general, a cylinder such as that described hereinabove can possibly be used for any of a number of hydraulic and/or pneumatic devices, which devices could include an adjustable strut assembly, an impact damper for a bumper, a vibration damper, a strut for a hatchback, a trunk or a hood of a motor vehicle, all of which are generally known and not described in any detail herein.

Figure 4:
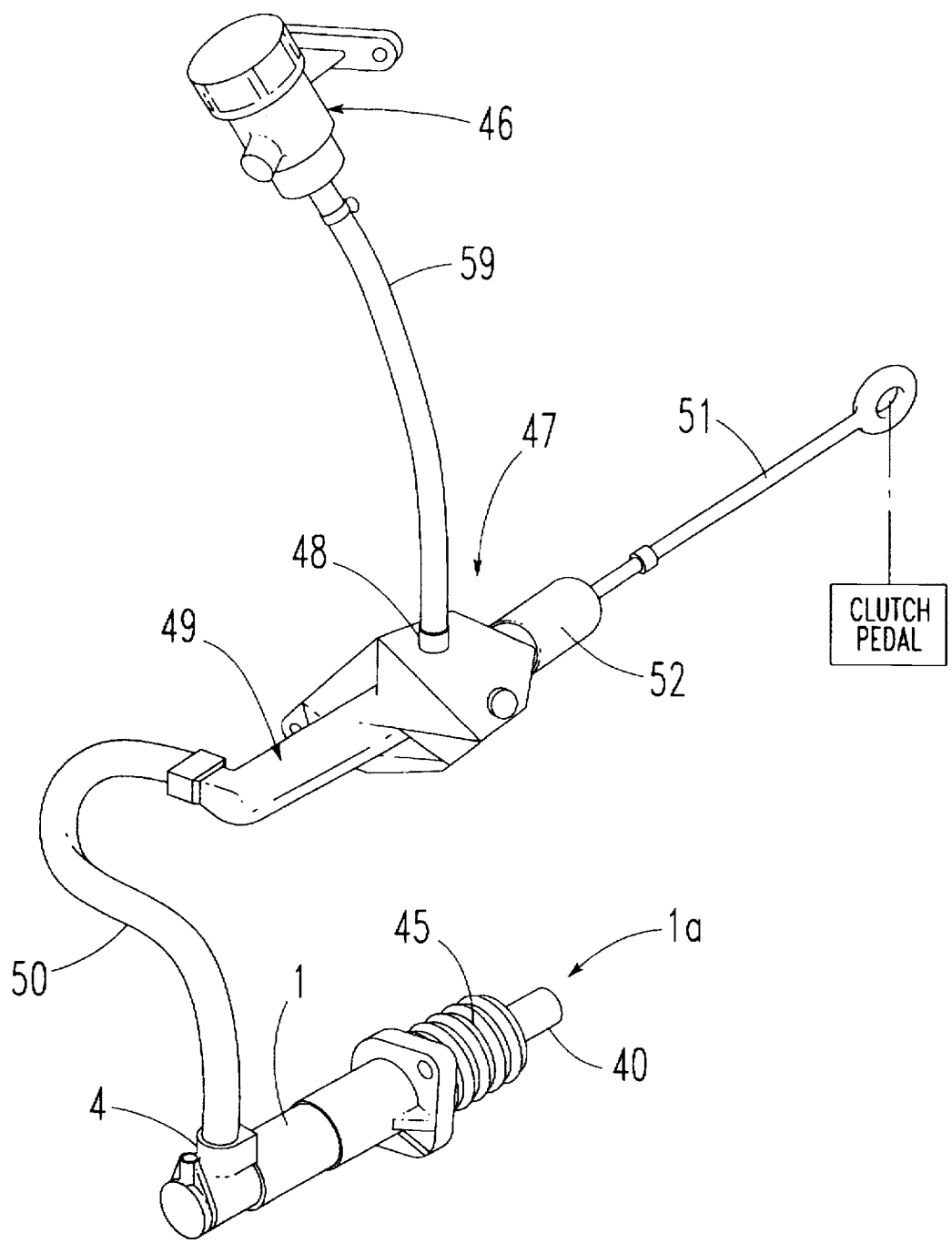
FIGS. 4 and 5 show examples of a hydraulically operated clutch assembly.

FIG. 4 essentially shows a view of one possible use of the cylinder 1a described hereinabove. As shown in FIG. 4, the cylinder 1a, in accordance with the present invention, could be used as a slave cylinder in a hydraulic clutch system. Such a system can preferably have a remote fluid reservoir 46 and a clutch master cylinder 47, the two being connected to one another by means of a line 59. The clutch master cylinder 47 can preferably be mounted opposite the dash of a motor vehicle, i.e. near the floor where the operator's feet would be, and can preferably be operated essentially directly off of the clutch pedal of the vehicle, preferably by means of a push rod 51, the clutch pedal being shown schematically in FIG. 4. In addition, the master cylinder 47 can also have a protective boot 52. The cylinder or slave cylinder 1a can preferably be mounted by means of fastening connection 15 (not shown in FIG. 4) on the clutch housing (not shown here, but see FIG. 5), as discussed above. As also discussed above, the connecting element 40 can preferably be attached to the clutch release fork or throwout lever (not shown here, but see FIG. 5).

The clutch master cylinder 47, in accordance with the embodiment shown in FIG. 4, preferably operates as the pump for pumping hydraulic fluid from reservoir 46, via a connection 48 and cylinder 49, to the slave cylinder 1a. When the clutch pedal is depressed, hydraulic fluid under pressure can be pumped into the slave cylinder 1a, via a line 50, and can cause the piston rod 39 (see FIG. 1A) to extend. The outer end of the piston rod 39 can cause the clutch release fork to pivot and force a clutch release bearing (not shown here, but see FIG. 5) to disengage the clutch. Since hydraulic systems are generally self-adjusting, when the clutch pedal is released, hydraulic pressure can fall of, and the piston rod 39 of the slave cylinder 1a can retract. The spring 43 discussed above can preferably serve to maintain the piston rod 39 in contact with the clutch release fork.

In accordance with an alternative embodiment not shown here, the cylinder 1a could also be used as the master cylinder 47 in the hydraulic clutch system shown in FIG. 4. For example, piston rod 39 can preferably be operatively attached to the clutch pedal by means of push rod 51, connection 14 can preferably be used to receive hydraulic fluid from reservoir 46, and connection 4 can be used to provide hydraulic fluid, via line 50, to the slave cylinder.

In accordance with at least one embodiment of the present invention, the connection 4 and the configuration of the pressure medium line 8 in accordance with the present invention, can preferably be used in essentially all of the connections necessary in the hydraulic clutch system. For example, the connection 4 can preferably be used for the connections between the master cylinder 47 and reservoir 46, and the connections between the master cylinder 47 and the slave cylinder 1a.

Figure 5:
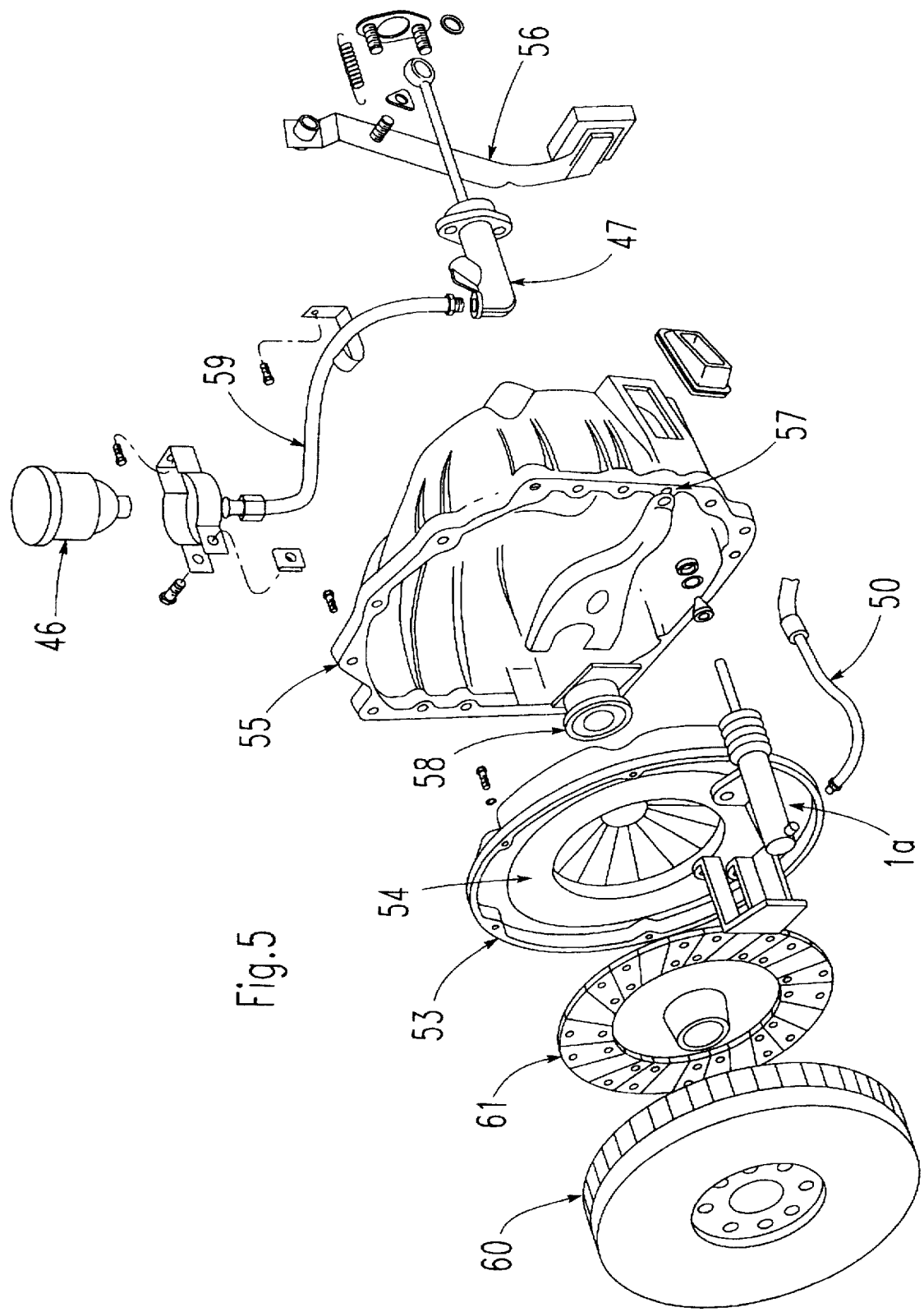

FIG. 5 shows a more complete hydraulic clutch system including a flywheel 60, a clutch disc 61, a clutch cover 53 having a movable pressure plate 54 disposed therein, and a clutch housing 55. In addition, the clutch system can also include a throwout or release bearing 58 and a clutch release fork or throwout lever 57, which release fork 57 can preferably be operatively attached to the slave cylinder 1a. The slave cylinder 1a can preferably be connected, via line 50, to master cylinder 47, the actual connection of which is not shown here for purposes of simplicity. As discussed above, the master cylinder 47 can preferably be connected to the clutch pedal 56, and to the reservoir 46 by means of line 59.

Figure 6:
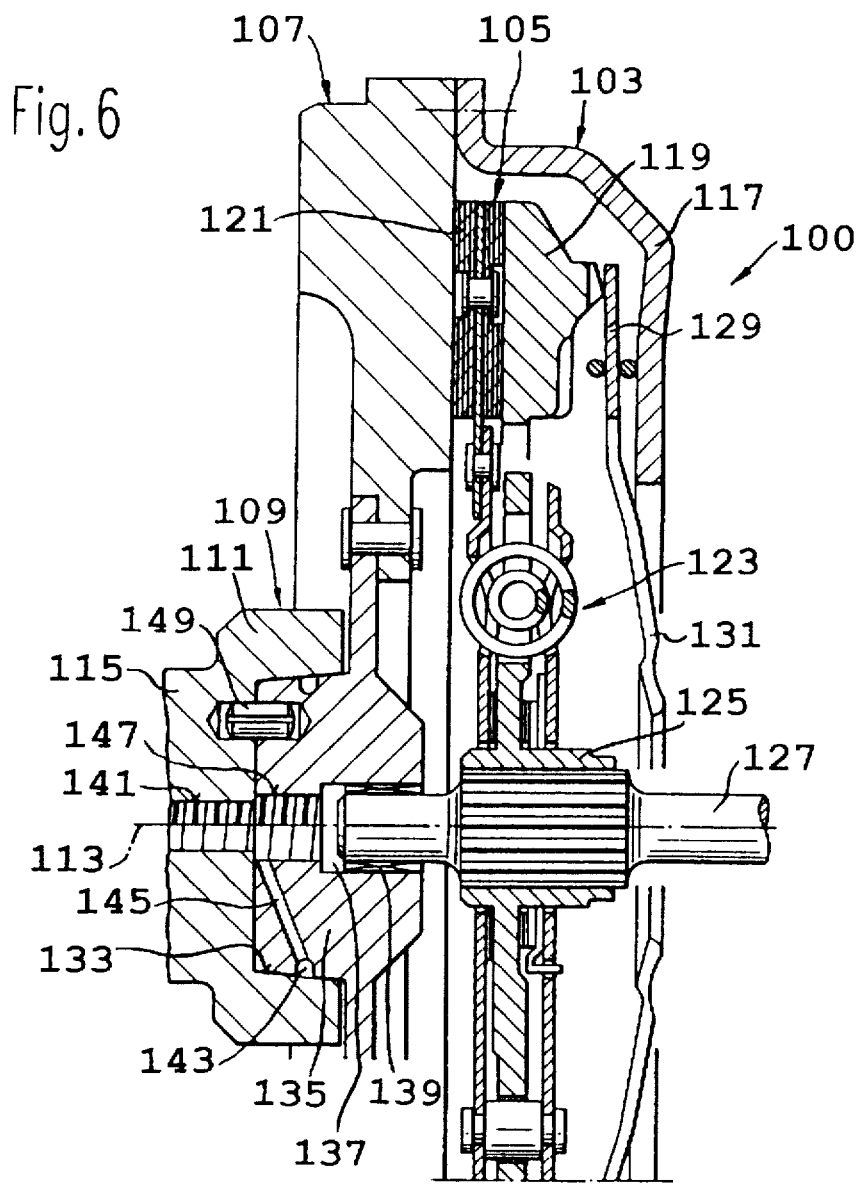
FIG. 6 shows a partial axial longitudinal section through a clutch assembly fastened to a crankshaft of an engine of a motor vehicle.

FIG. 6 shows a motor vehicle friction clutch 100 with which the present invention could be utilized. It should be understood that the components found hereinbelow can be considered as being interchangeable with any similar components discussed hereinabove. The friction clutch 100 shown in FIG. 6 can generally include a pressure plate unit, designated 100 in general, a clutch disc 105 and a flywheel 107. The friction clutch 100 can preferably be mounted by means of a fastening system 109, preferably on the output end 111 of a crankshaft 115, which crankshaft 115 can rotate around an axis of rotation 113 on an internal combustion engine (not shown) of the motor vehicle.

The pressure plate unit 103, in a manner which is well known in the art, can have a clutch housing 117 which clutch housing 117 can be fixed to the flywheel 107, for example by welding, so that the clutch housing 117 can be detached, but preferably does not detach during operation. An essentially disc-shaped application plate or pressure plate 119 can be mounted on the clutch housing 117. The application plate 119 can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 119 can be mounted by means of tangential leaf springs so that the application plate 119 essentially does not rotate, but can preferably move axially.

Preferably between the application plate 119 and the flywheel 107, there can be friction linings 121 of the clutch disc 105, which friction linings 121 can be connected to a hub 125 of the clutch disc 105 in a manner well known in the art, such as by means of a torsional vibration damper 123, preferably in a rotationally elastic manner. The clutch disc 105 can be guided preferably by means of the hub 125 in an essentially non-rotating, but axially movable manner on an input shaft 127 of a transmission. The input shaft 127 can preferably be disposed downstream of the friction clutch 100 in the torque transmission path. A membrane spring 129, preferably held in the clutch housing 117, can apply pressure to the application plate 119, and the friction lining 121 can hold the application plate 119 in a friction-tight manner preferably against the flywheel 107. A disconnecting lever (not shown here) such as throwout lever 57 shown in FIG. 5, can act on the flexible tongues 131 preferably of the membrane spring 129; whereby the load on the application plate 119 can be relieved and the clutch 100 can be disconnected or disengaged. In accordance with one embodiment, if the present invention is utilized as a slave cylinder as discussed hereinabove with reference to FIG. 4, the slave cylinder 1a (not shown here) can preferably be operatively attached, by means of piston rod 39, to the throwout lever, the throwout lever then causing the membrane spring 129 to release the load on the application plate 119. Additional types of disconnecting or disengaging levers may be disclosed in U.S. Pat. No. 4,751,990 to Schraut et al. on Jun. 21, 1988, entitled "Multi-disc Clutch Unit, Particularly for Heavy Duty Motor Vehicles", and U.S. Pat. No. 4,238,018 to Maucher on Dec. 9, 1980, entitled "Disengaging Unit for Drawing Disengagable Friction Clutches".

The output end 111 of the crankshaft can preferably contain a central opening 133 in the face of the crankshaft 115, the inner jacket or surface of which opening 133 can form a taper surface which can taper axially into the crankshaft 115. A conical extension 135 which can project axially from the flywheel 107, can extend into the opening 133 in the end of the crankshaft 115, and the outer jacket of the conical extension 135 can have a taper surface which can essentially match the inner jacket of the opening 133 in the face of the crankshaft 115. The matching taper surfaces of the opening 133 and of the conical extension 135 can form the essentially axial joint surfaces of a radial interference fit, which can radially guide the flywheel 107 on the crankshaft 115, and can transmit the torque from the crankshaft 115 to the clutch 100.

The conical extension 135 can form a hub of the flywheel 107 and can contain a progressively stepped hole 137, which stepped hole 137 can expand radially toward the clutch disc 105. The stepped hole 137, preferably in its expanded portion, can house a pilot bearing 139, preferably for the radial guidance of the crankshaft-side end 115 of the transmission input shaft 127. The face or central opening 133 can continue or extend along the same axis as the stepped hole 137, preferably into a threaded hole 141, into which threaded hole 141 a clamping bolt (not shown) can be screwed through the hub 125, preferably for the assembly of the friction clutch 100, before the insertion of the transmission input shaft 127 into the hub 125. By means of the clamping bolt, which is not illustrated in any further detail and should be removed following assembly, the conical extension 135 can be axially pressed into the opening 133 in the end of the crankshaft 115.

The flywheel 107 can preferably be removed from the crankshaft 115 by means of hydraulically actuated extraction devices, which can preferably act by means of rod-sleeve connections through the hub 125 of the clutch disc 105 to the connection area 109. The conical extension 135 can be provided with threaded connections, for example, in the vicinity of its graduated or stepped hole 137. The extraction of the flywheel 107 from the output end 111 can also possibly be done by hydraulic expansion of the output end 111. For this purpose, there can preferably be a ring-shaped groove 143 on the circumference of the conical extension 135, which ring-shaped groove 143 can be connected by means of one or more radial channels 145, to a central pressure medium connection, e.g. designed as a threaded hole 147. The threaded hole 147 may form a part of the stopped hole 137. The pressure medium connection 147 can preferably be connected through the hub 125 of the clutch disc 105 to a hydraulic pressure unit (not shown), which hydraulic pressure unit can hydraulically expand the opening 133 in the end of the crankshaft 115, preferably by means of the closed circular line or groove 143.

The flywheel 107 can be connected relative to the crankshaft 115 by means of an indexing pin 149, which indexing pin 149 can define the angular position of the flywheel 107 relative to the crankshaft 115.

It should be understood that the friction clutch 100 shown in FIG. 6 is presented only by way of example of one type of clutch in which the present invention may be incorporated.

One feature of the invention resides broadly in the cylinder for hydraulic systems, in particular for motor vehicles, consisting of a housing with an axial hole in which a piston is guided so that the piston can be displaced axially, and on which one end surface is pressurized by means of hydraulic fluid, whereby the cylinder is provided with at least one connection designed as a plug-in connection for at least one pressure medium line having at least one radial expansion on its outside diameter, a connection to a fluid chamber and means for fastening, characterized by the fact that the pressure medium line 8 is located in a hole 6 of the connection 4, which has a recess 20 over at least a portion of its circumference, and can be axially fixed on one end with its radial expansion 11 by means of a spring element 9 located in the recess 20, and on the other end by means of a support element 30 of the connection 4.

Another feature of the invention resides broadly in the cylinder characterized by the fact that the end of the radial expansion 11 of the pressure medium line 8 facing the support element 30 of the connection 4, at least in the area of contact with the support element 30, has an external surface 32 which is engaged with the support element 30, with a cross section which decreases, preferably conically, toward the support element 30.

Yet another feature of the invention resides broadly in the cylinder characterized by the fact that the support element 30 is radially guided inside the connection 4, but can move axially, and its travel in the direction in which the radial expansion 11 of the pressure medium line 8 points can be limited by a stop 34 of the connection 4.

Still another feature of the invention resides broadly in the cylinder characterized by the fact that the support element 30 is formed by an elastic ring.

A further feature of the invention resides broadly in the cylinder characterized by the fact that the spring element 9 is an essentially U-shaped clip.

Another feature of the invention resides broadly in the cylinder characterized by the fact that the two legs 36 of the spring element 9 run at approximately right angles to the longitudinal direction of the pressure medium line 8 and tangentially enclose the pressure medium line 8 on both sides.

Some examples of clutch assemblies and various components associated therewith which could possibly utilize the present invention may be disclosed in the following U.S. patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. patents: U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Types of impact dampers for bumpers which could possibly utilize the present invention may be disclosed in the following U.S. patents; U.S. Pat. No. 4,809,924 to Martens et al., entitled "Hydraulic Bumper"; U.S. Pat. No. 5,096,242 to Chin-Hun, entitled "Shock Absorbing Bumper System"; and U.S. Pat. No. 5,277,462 to Verzelli et al., entitled "High-performance Car Bumper Module".

Types of strut assemblies which could possibly utilize the present invention may be disclosed in the following U.S. patents: U.S. Pat. No. 4,828,237 to Neff, entitled "Reduced Length MacPherson Strut"; and U.S. Pat. No. 4,861,066 to Dernie, entitled "Vehicle Suspension Strut Systems".

The appended drawings in their entirety, including all dimensions, proportions and/or shapes in at least one embodiment of the invention, are accurate and to scale and are hereby included by reference into this specification.

All of the patents, patent applications and publications recited herein are hereby incorporated by reference as if set forth in their entirety herein.

The corresponding foreign patent publication applications, namely, Federal Republic of Germany Patent Application No. P 44 04 731.2, filed on Feb. 16, 1994, having inventors Wolfgang Grosspietsch, Herbert Voit and Manfred Wehner, and DE-OS P 44 04 731.2 and DE-PS P 44 04 731.2, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising at least one friction lining for contacting said pressure plate and said flywheel during engagement of said clutch disc with said flywheel;

an arrangement to hydraulically actuate said clutch disc;

said arrangement to hydraulically actuate said clutch disc comprising:

a cylinder, said cylinder having a first end and a second end and defining a chamber therein, at least a portion of said chamber comprising hydraulic fluid therein;

a piston rod extending through said first end of said cylinder and into said chamber;

a first arrangement to operatively connect said pressure plate to one of: said cylinder and said piston rod;

13 an arrangement to provide hydraulic fluid into and out of said chamber, said arrangement to provide hydraulic fluid comprising a male fastening device, said male fastening device having a longitudinal axis;

a pedal for applying pressure to the hydraulic fluid within said chamber to operate said pressure plate to apply said axially directed force, at least a portion of said pedal being disposed in a passenger compartment of a motor vehicle;

a second arrangement to operatively connect said pedal to the other one of: said cylinder and said piston rod; and said cylinder comprising:

a piston disposed on said piston rod within said chamber, said piston dividing said chamber into at least two chamber portions, said piston being movable within said chamber;

at least one of said at least two chamber portions being configured to contain said hydraulic fluid therein;

an arrangement to connect said arrangement to provide hydraulic fluid to said at least one of said at least two chamber portions containing hydraulic fluid therein; and said arrangement to connect comprising a female fastening device configured for receiving said male fastening device;

said male fastening device comprising a tubular portion having first and second parts, said first part for being inserted into said female fastening device, said second part being disposed immediately adjacent said first part;

said first part of said tubular portion comprising an outward, radial deformation of said tubular portion, said outward, radial deformation having a diameter greater than a diameter of said second part;

said arrangement to connect comprising a clip for being disposed about said second part of said tubular portion for axially fixing, with respect to said longitudinal axis of said male fastening device, said first part of said tubular portion within said female fastening device, said clip for being disposed adjacent said outward, radial deformation of said first part of said tubular portion;

said chamber of said cylinder having a longitudinal axis;

said female fastening device of said arrangement to connect having a longitudinal axis, said longitudinal axis of said female fastening device being disposed at an acute angle with respect to said longitudinal axis of said chamber, said acute angle being a substantial acute angle;

said cylinder comprising a housing disposed about and defining said chamber;

said female fastening device being integral, unitary and homogeneous with said housing;

said female fastening device of said arrangement to connect comprising a radial recess, a portion of said clip being disposed in said radial recess to axially fix said clip with respect to said female fastening device;

said radial recess comprising an arrangement to selectively permit removal of said clip from said radial recess and subsequent reinstallation of said clip into said radial recess;

said clip further comprises:

a base portion, said base portion being disposed substantially outside of said radial recess;

14 said base portion being configured for installing and removing said clip from said radial recess;

a first leg and a second leg disposed both opposite to and spaced apart from one another, and extending from said base portion;

said first and second legs for being disposed about said male fastening device and for tangentially enclosing at least a portion of said male fastening device therebetween; and said first leg and said second leg for being disposed substantially perpendicular to said longitudinal axis of said male fastening device; and said outward, radial deformation of said first part comprising a substantially conical portion disposed radially about said longitudinal axis of said male fastening device.

2. The clutch assembly according to claim 1 wherein:

said female fastening device comprises an orifice having a longitudinal axis, said longitudinal axis of said orifice being in substantial alignment with said longitudinal axis of said male fastening device;

said arrangement to connect further comprises a support member slidably disposed within said orifice and about said male fastening device, said support member being configured for radially guiding said first part of said tubular portion of said male fastening device within said orifice of said female fastening device;

said orifice of said female fastening device comprises a first orifice portion and a second orifice portion disposed immediately adjacent one another, said first orifice portion being disposed adjacent said at least one of said at least two chamber portions containing said hydraulic fluid therein;

at least a portion of said first part of said tubular portion of said male fastening device is disposed in said first orifice portion, said outward, radial deformation of said first part being disposed in said second orifice portion;

said first orifice portion has a diameter disposed perpendicular to, and intersecting, said longitudinal axis of said orifice;

said second orifice portion has a diameter disposed perpendicular to, and intersecting, said longitudinal axis of said orifice, said diameter of said second orifice portion being substantially greater than said diameter of said first orifice portion; and said second orifice portion comprises a stop edge disposed substantially radially about said longitudinal axis of said orifice, said stop edge being configured for preventing movement of said support member and said male fastening device towards said first orifice portion.

3. The clutch assembly according to claim 2 wherein:

said substantially conical portion of said first part of said tubular portion has a plurality of diameters disposed perpendicular to said longitudinal axis of said male fastening device, ones of said plurality of diameters decreasing in a direction along said longitudinal axis of said male fastening device, towards said first orifice portion;

one of said plurality of diameters of said substantially conical portion is a maximum diameter, and one of said plurality of diameters is a minimum diameter, said minimum diameter being disposed nearer to said first orifice portion than said maximum diameter;

said second part of said tubular portion comprises a substantially radial surface portion disposed perpendicular to said longitudinal axis of said male fastening device, said substantially radial surface portion being disposed immediately adjacent said maximum diameter; and at least a portion of said clip is disposed to contact said substantially radial surface portion for axially fixing said male fastening device within said female fastening device.

4. The clutch assembly according to claim 3 wherein:

said outward, radial deformation of said first part of said tubular portion has been formed by an outward, radial deformation of said tubular portion;

said radial recess is disposed substantially perpendicular with respect to said orifice of said female fastening device;

said clip comprises a substantially U-shaped clip;

said arrangement to connect further comprises a sealing member disposed between said support member and said stop edge of said second orifice portion;

said arrangement to connect is disposed at said second end of said cylinder;

said cylinder further comprises an arrangement to fasten said cylinder to a clutch housing;

said piston rod has a first end and a second end, said piston being attached to said first end of said piston rod;

said second end of said piston rod extends out of said first end of said cylinder;

said cylinder further comprises:
  a bellows portion surrounding said second end of said piston rod and disposed adjacent said arrangement to fasten;
  a slave cylinder;

said first arrangement to operatively connect said pressure plate to one of: said cylinder and said piston rod comprises a lever attached to said piston rod;

said second arrangement to operatively connect said pedal to the other one of: said cylinder and said piston rod comprises a master cylinder, said master cylinder having an arrangement to transfer hydraulic fluid to and from said slave cylinder;

said at least two chamber portions comprise a first chamber portion and a second chamber portion, said first chamber portion being in fluid communication with said arrangement to provide hydraulic fluid;

said first chamber portion comprises a base surface disposed immediately adjacent said arrangement to connect; and said cylinder further comprises a spring extending between said piston and said base surface.

5. A piston-cylinder arrangement for a hydraulic system in a motor vehicle, said piston-cylinder arrangement comprising:

a hydraulic actuating arrangement;

said hydraulic actuating arrangement comprising:
  a cylinder, said cylinder having a first end and a second end and defining a chamber therein, at least a portion of said chamber comprising hydraulic fluid therein;
  a piston rod extending through said first end of said cylinder and into said chamber;
  an arrangement to provide hydraulic fluid into and out of said chamber, said arrangement to provide hydraulic fluid comprising a male fastening device, said male fastening device having a longitudinal axis; and said cylinder comprising:
  a piston disposed on said piston rod within said chamber, said piston dividing said chamber into at least two chamber portions, said piston being movable within said chamber;
  at least one of said at least two chamber portions being configured to contain said hydraulic fluid therein;
  an arrangement to connect said arrangement to provide hydraulic fluid to said at least one of said at least two chamber portions containing hydraulic fluid therein; and
  said arrangement to connect comprising a female fastening device configured for receiving said male fastening device;

said male fastening device comprising a tubular portion having first and second parts, said first part for being inserted into said female fastening device, said second part being disposed immediately adjacent said first part;

said first part of said tubular portion comprising an outward, radial deformation of said tubular portion, said outward, radial deformation having a diameter greater than a diameter of said second part;

said arrangement to connect comprising a clip for being disposed about said second part of said tubular portion for axially fixing, with respect to said longitudinal axis of said male fastening device, said first part of said tubular portion within said female fastening device, said clip for being disposed adjacent said outward, radial deformation of said first part of said tubular portion;

said cylinder comprising a housing disposed about and defining said chamber;

said female fastening device being integral, unitary and homogeneous with said housing;

said chamber of said cylinder having a longitudinal axis;

said female fastening device of said arrangement to connect having a longitudinal axis, said longitudinal axis of said female fastening device being disposed at an acute angle with respect to said longitudinal axis of said chamber, said acute angle being a substantial acute angle;

said female fastening device of said arrangement to connect comprising a radial recess, a portion of said clip being disposed in said radial recess to axially fix said clip with respect to said female fastening device;

said radial recess comprising an arrangement to selectively permit removal of said clip from said radial recess and subsequent reinstallation of said clip into said radial recess; and said clip further comprises:
  a base portion, said base portion being disposed substantially outside of said radial recess;
  said base portion being configured for installing and removing said clip from said radial recess;
  a first leg and a second leg disposed both opposite to and spaced apart from one another, and extending from said base portion;
  said first and second legs for being disposed about said male fastening device and for tangentially enclosing at least a portion of said male fastening device therebetween; and
  said first leg and said second leg for being disposed substantially perpendicular to said longitudinal axis of said male fastening device; and said outward, radial deformation of said first part comprising a substantially conical portion disposed radially about said longitudinal axis of said male fastening device.

6. The arrangement according to claim 5 wherein:

said female fastening device comprises an orifice having a longitudinal axis, said longitudinal axis of said orifice being in substantial alignment with said longitudinal axis of said male fastening device;

said arrangement to connect further comprises a support member slidably disposed within said orifice and about said male fastening device, said support member being configured for radially guiding said first part of said tubular portion of said male fastening device within said orifice of said female fastening device;

said orifice of said female fastening device comprises a first orifice portion and a second orifice portion disposed immediately adjacent one another, said first orifice portion being disposed adjacent said at least one of said at least two chamber portions containing said hydraulic fluid therein;

at least a portion of said first part of said tubular portion of said male fastening device is disposed in said first orifice portion, said outward, radial deformation of said first part being disposed in said second orifice portion;

said first orifice portion has a diameter disposed perpendicular to, and intersecting, said longitudinal axis of said orifice;

said second orifice portion has a diameter disposed perpendicular to, and intersecting, said longitudinal axis of said orifice, said diameter of said second orifice portion being substantially greater than said diameter of said first orifice portion; and said second orifice portion comprises a stop edge disposed substantially radially about said longitudinal axis of said orifice, said stop edge being configured for preventing movement of said support member and said male fastening device towards said first orifice portion.

7. The arrangement according to claim 6 wherein:

said substantially conical portion of said first part of said tubular portion has a plurality of diameters disposed perpendicular to said longitudinal axis of said male fastening device, ones of said plurality of diameters decreasing in a direction along said longitudinal axis of said male fastening device, towards said first orifice portion;

one of said plurality of diameters of said substantially conical portion is a maximum diameter, and one of said plurality of diameters is a minimum diameter, said minimum diameter being disposed nearer to said first orifice portion than said maximum diameter;

said second part of said tubular portion comprises a substantially radial surface portion disposed perpendicular to said longitudinal axis of said male fastening device, said substantially radial surface portion being disposed immediately adjacent said maximum diameter; and at least a portion of said clip is disposed to contact said substantially radial surface portion for axially fixing said male fastening device within said female fastening device.

8. The arrangement according to claim 7 wherein:

said radial recess is disposed substantially perpendicular to said orifice of said female fastening device;

said outward, radial deformation of said first part of said tubular portion has been formed by an outward, radial deformation of said tubular portion;

said clip comprises a substantially U-shaped clip;

said arrangement to connect further comprises a sealing member disposed between said support member and said stop edge of said second orifice portion;

said arrangement to connect is disposed at said second end of said cylinder;

said piston rod has a first end and a second end, said piston being attached to said first end of said piston rod;

said second end of said piston rod extends out of said first end of said cylinder;

said cylinder further comprises a bellows portion surrounding said second end of said piston rod;

said at least two chamber portions comprise a first chamber portion and a second chamber portion, said first chamber portion being in fluid communication with said arrangement to provide hydraulic fluid;

said first chamber portion comprises a base surface disposed immediately adjacent said arrangement to connect; and said cylinder further comprises a spring extending between said piston and said base surface.

9. A method of assembling a hydraulically operated clutch for a motor vehicle, said clutch assembly comprising: a flywheel defining an axis of rotation and an axial direction parallel to the axis of rotation; a clutch disc; a pressure plate for applying an axially directed force to said clutch disc, with respect to said axis of rotation of said flywheel, to engage said clutch disc with said flywheel; said clutch disc being disposed between said flywheel and said pressure plate; said clutch disc comprising at least one friction lining for contacting said pressure plate and said flywheel during engagement of said clutch disc with said flywheel; an arrangement to hydraulically actuate said clutch disc; said arrangement to hydraulically actuate said clutch disc comprising: a cylinder, said cylinder having a first end and a second end and defining a chamber therein, at least a portion of said chamber comprising hydraulic fluid therein; a piston rod extending through said first end of said cylinder and into said chamber; a first arrangement to operatively connect said pressure plate to one of: said cylinder and said piston rod; an arrangement to provide hydraulic fluid into and out of said chamber, said arrangement to provide hydraulic fluid comprising a male fastening device, said male fastening device having a longitudinal axis; a pedal for applying pressure to the hydraulic fluid within said chamber to operate said pressure plate to apply said axially directed force, at least a portion of said pedal being disposed in a passenger compartment of a motor vehicle; a second arrangement to operatively connect said pedal to the other one of: said cylinder and said piston rod; said cylinder comprising: a piston disposed on said piston rod within said chamber, said piston dividing said chamber into at least two chamber portions, said piston being movable within said chamber; at least one of said at least two chamber portions being configured to contain said hydraulic fluid therein; an arrangement to connect said arrangement to provide hydraulic fluid to said at least one of said at least two chamber portions containing hydraulic fluid therein; said arrangement to connect comprising a female fastening device configured for receiving said male fastening device; said male fastening device comprising a tubular portion having first and second parts, said first part for being inserted into said female fastening device, said second part being disposed immediately adjacent said first part; said first part of said tubular portion comprising an outward, radial deformation of said tubular portion, said outward, radial deformation having a diameter greater than a diameter of said second part; and said arrangement to connect comprising a clip for being disposed about said second part of said tubular portion for axially fixing, with respect to said longitudinal axis of said male fastening device, said first part of said tubular portion within said female fastening device, said clip for being disposed adjacent said outward, radial deformation of said first part of said tubular portion, said method comprising the steps of:

providing a flywheel defining an axis of rotation and an axial direction parallel to the axis of rotation;

providing a clutch disc;

providing a pressure plate for applying an axially directed force to said clutch disc, with respect to said axis of rotation of said flywheel, to engage said clutch disc with said flywheel;

said step of providing said clutch disc further comprising providing at least one friction lining for contacting said pressure plate and said flywheel during engagement of said clutch disc with said flywheel;

providing an arrangement to hydraulically actuate said clutch disc;

said step of providing said arrangement to hydraulically actuate said clutch disc further comprising:

providing a cylinder, said cylinder having a first end and a second end and defining a chamber therein, at least a portion of said chamber comprising hydraulic fluid therein;

providing a piston rod;

providing a first arrangement to operatively connect said pressure plate to one of: said cylinder and said piston rod;

providing an arrangement to provide hydraulic fluid into and out of said chamber;

said step of providing said arrangement to provide hydraulic fluid further comprising providing a male fastening device, said male fastening device having a longitudinal axis;

providing a pedal to apply pressure to the hydraulic fluid within said chamber to operate said pressure plate to apply said axially directed force;

providing a second arrangement to operatively connect said pedal to the other one of: said cylinder and said piston rod;

said step of providing said cylinder further comprising: providing a piston;

providing an arrangement to connect said arrangement to provide hydraulic fluid to said at least one of said at least two chamber portions containing hydraulic fluid therein;

said step of providing said arrangement to connect further comprising providing a female fastening device;

said step of providing said male fastening device further comprising providing a tubular portion having first and second parts;

said step of providing said arrangement to connect further comprising providing a clip;

said method further comprising the steps of:

disposing said clutch disc between said flywheel and said pressure plate;

inserting said piston rod through said first end of said cylinder and into said chamber;

operatively connecting, with said first arrangement to operatively connect, said pressure plate to one of: said cylinder and said piston rod;

disposing at least a portion of said pedal in the passenger compartment of a motor vehicle;

operatively connecting, with said second arrangement to operatively connect, said pedal to the other one of: said cylinder and said piston rod;

disposing said piston on said piston rod within said chamber, said piston dividing said chamber into at least two chamber portions, said piston being movable within said chamber;

configuring at least one of said at least two chamber portions to contain said hydraulic fluid therein;

configuring said female fastening device for receiving said male fastening device;

disposing said second part of said tubular portion immediately adjacent said first part of said tubular portion;

configuring said first part of said tubular portion to comprise an outward, radial deformation, said outward, radial deformation having a diameter greater than a diameter of said second part;

connecting, with said arrangement to connect, said arrangement to provice hydraulic fluid to said at least one of said at least two chamber portions containing hydraulic fluid therein;

said step of connecting with said arrangement to connect further comprising:

inserting said first part with said outward, radial deformation, into said female fastening device;

disposing said clip about said second part of said tubular portion and adjacent said outward, radial deformation of said first part, and axially fixing, with respect to said longitudinal axis of said male fastening device, said first part of said tubular portion within said female fastening device;

configuring said cylinder to further comprise a housing and disposing said housing about said chamber to define said chamber;

configuring said female fastening device to be integral, unitary and homogeneous with said housing;

said female fastening device and said chamber each having a longitudinal axis, said method further comprising:

disposing said female fastening device such that said longitudinal axis of said female fastening device is at a substantial acute angle with respect to said longitudinal axis of said chamber;

configuring said female fastening device to have a radial recess;

disposing a portion of said clip in said radial recess and axially fixing said clip with respect to said female fastening device;

configuring said radial recess to comprise an arrangement to selectively permit removal of said clip from said radial recess and subsequent reinstallation of said clip into said radial recess; and configuring said outward, radial deformation of said first part to comprise a substantially conical portion and disposing said substantially conical portion radially about said longitudinal axis of said male fastening device.

10. The method according to claim 9 further comprising:

configuring said female fastening device to comprise an orifice having a longitudinal axis and aligning said longitudinal axis of said orifice with said longitudinal axis of said male fastening device;

configuring said arrangement to connect to further comprise a support member and slidably disposing said support member within said orifice and about said male fastening device;

radially guiding, with said support member, said first part of said tubular portion of said male fastening device within said orifice of said female fastening device;

disposing said radial recess substantially perpendicular to said orifice of said female fastening device;

configuring said orifice of said female fastening device to comprise a first orifice portion and a second orifice portion and disposing said first and second orifice portions immediately adjacent one another;

disposing said first orifice portion adjacent said at least one of said at least two chamber portions containing said hydraulic fluid therein;

disposing at least a portion of said first part of said tubular portion of said male fastening device in said first orifice portion;

disposing said outward, radial deformation of said first part in said second orifice portion;

configuring said first orifice portion to have a diameter disposed perpendicular to, and intersecting, said longitudinal axis of said orifice;

configuring said second orifice portion to have a diameter disposed perpendicular to, and intersecting, said longitudinal axis of said orifice, said diameter of said second orifice portion being substantially greater than said diameter of said first orifice portion;

configuring said second orifice portion to comprises a stop edge and disposing said stop edge substantially radially about said longitudinal axis of said orifice;

configuring said stop edge for preventing movement of said support member and said male fastening device towards said first orifice portion.

11. The method according to claim 10 further comprising:

configuring said substantially conical portion of said first part of said tubular portion to have a plurality of diameters and disposing said plurality of diameters perpendicular to said longitudinal axis of said male fastening device, ones of said plurality of diameters decreasing in a direction along said longitudinal axis of said male fastening device, towards said first orifice portion;

one of said plurality of diameters of said substantially conical portion is a maximum diameter, and one of said plurality of diameters is a minimum diameter;

disposing said minimum diameter nearer to said first orifice portion than said maximum diameter;

configuring said second part of said tubular portion to comprise a substantially radial surface portion and disposing said substantially radial surface portion perpendicular to said longitudinal axis of said male fastening device;

disposing said substantially radial surface portion immediately adjacent said maximum diameter; and disposing at least a portion of said clip to contact said substantially radial surface portion and axially fixing said male fastening device within said female fastening device.

12. The method according to claim 11 further comprising:

forming said outward, radial deformation of said first part of said tubular portion by an outward, radial deformation of said tubular portion;

configuring said clip to comprise a substantially U-shaped clip;

said chamber of said cylinder has a longitudinal axis;

configuring said arrangement to connect to further comprise a sealing member and disposing said sealing member between said support member and said stop edge of said second orifice portion;

disposing said arrangement to connect at said second end of said cylinder;

configuring said clip to further comprise:
a base portion;
a first leg and a second leg;

disposing said first and second leg opposite to and spaced apart from one another, said first and second leg extending from said base portion;

disposing said base portion substantially outside of said radial recess;

disposing said first and second legs about said male fastening device, said first leg and said second leg tangentially enclose at least a portion of said male fastening device therebetween;

disposing said first leg and said second leg substantially perpendicular to said longitudinal axis of said male fastening device; and configuring said base portion for installing and removing said clip from said arrangement to connect.

13. The method according to claim 12 further comprising:

configuring said cylinder to further comprise an arrangement to fasten said cylinder to a clutch housing and fastening said cylinder to a clutch housing;

configuring said piston rod to have a first end and a second end and attaching said piston to said first end of said piston rod;

extending said second end of said piston rod out of said cylinder;

configuring said cylinder to further comprise a bellows portion and disposing said bellows portion to surround said second end of said piston rod, and further disposing said bellows portion adjacent said arrangement to fasten;

configuring said cylinder to comprise a slave cylinder;

configuring said first arrangement to operatively connect said pressure plate to one of: said cylinder and said piston rod to comprise a lever, and attaching said lever to said piston rod;

configuring said second arrangement to operatively connect said pedal to the other one of: said cylinder and said piston rod to comprise a master cylinder, said master cylinder having an arrangement to transfer hydraulic fluid to and from said slave cylinder;

configuring said at least two chamber portions to comprise a first chamber portion and a second chamber portion, said first chamber portion being in fluid communication with said arrangement to provide hydraulic fluid;

configuring said first chamber portion to comprise a base surface and disposing said base surface immediately adjacent said arrangement to connect; and configuring said cylinder to further comprise a spring, and extending said spring between said piston and said base surface.

* * * * *

UNITED STATES PATENT AND TRADEMARK OFFICE
CERTIFICATE OF CORRECTION

PATENT NO. : 5,779,019
DATED : July 14, 1998
INVENTOR(S) : Wolfgang GROSSPIETSCH, Herbert VOIT, and Manfred WEHNER It is certified that error appears in the above-identified patent and that said Letters Patent is hereby corrected as shown below:

In column 2, line 7, after 'particular', delete "it" and insert --if--.

In column 2, line 34, after 'distinct', delete "inventions" and insert --invention.--.

In column 2, line 40, after 'motor', delete "vehicles" and insert --vehicle,--.

In column 5, line 66, after 'cylinder', delete "1A" and insert --1a--.

In column 5, line 66, after 'and', delete "1a" and insert --1A--.

Signed and Sealed this

Twenty-ninth Day of December, 1998

Attest:

BRUCE LEHMAN

*Attesting Officer*    *Commissioner of Patents and Trademarks*